United States Patent
Yae et al.

(10) Patent No.: US 9,467,800 B2
(45) Date of Patent: Oct. 11, 2016

(54) METHOD AND APPARATUS FOR REGISTERING NEW BLUETOOTH DEVICE

(71) Applicants: HYUNDAI MOTOR COMPANY, Seoul (KR); Kia Motors Corporation, Seoul (KR)

(72) Inventors: Seong Soo Yae, Osan-si (KR); Woo Young Kwak, Suwon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 79 days.

(21) Appl. No.: 14/552,033

(22) Filed: Nov. 24, 2014

(65) Prior Publication Data

US 2016/0007140 A1  Jan. 7, 2016

(30) Foreign Application Priority Data

Jul. 2, 2014 (KR) .................. 10-2014-0082358

(51) Int. Cl.
| | |
|---|---|
| H04M 1/60 | (2006.01) |
| H04W 4/00 | (2009.01) |
| H04M 1/725 | (2006.01) |
| H04W 76/02 | (2009.01) |
| H04B 1/3822 | (2015.01) |

(52) U.S. Cl.
CPC ........... *H04W 4/008* (2013.01); *H04M 1/7253* (2013.01); *H04W 76/027* (2013.01); *H04B 1/3822* (2013.01); *H04M 1/6075* (2013.01); *H04M 2250/02* (2013.01)

(58) Field of Classification Search
CPC ............ H04B 1/3822; H04M 1/6075; H04M 2250/02
See application file for complete search history.

(56) References Cited

U.S. PATENT DOCUMENTS

| | | | | |
|---|---|---|---|---|
| 2004/0264387 | A1* | 12/2004 | Gibeau .............. | B60R 16/0315 370/254 |
| 2007/0140187 | A1* | 6/2007 | Rokusek ................ | H04L 67/16 370/338 |
| 2008/0039018 | A1* | 2/2008 | Kim .................... | H04M 1/6066 455/41.2 |
| 2012/0071096 | A1* | 3/2012 | Matsushita ......... | H04M 1/6075 455/41.2 |
| 2015/0271858 | A1* | 9/2015 | Chu .................... | H04B 5/0031 455/41.2 |
| 2015/0308396 | A1* | 10/2015 | Elzein ................ | F02N 11/0807 455/420 |

(Continued)

FOREIGN PATENT DOCUMENTS

| | | |
|---|---|---|
| KR | 2002-0066249 A | 8/2002 |
| KR | 2005-0033181 A | 4/2005 |
| KR | 2007-0098127 A | 10/2007 |

(Continued)

OTHER PUBLICATIONS

Korean Office Action issued in Korean Application No. 10-2014-0082358 dated Oct. 21, 2015.

*Primary Examiner* — David Bilodeau
(74) *Attorney, Agent, or Firm* — McDermott Will & Emery LLP

(57) ABSTRACT

An in-vehicle Bluetooth pairing method includes commencing an automatic Bluetooth connection procedure with a first user device when power is supplied to an in-vehicle head unit. A progress state of the commenced automatic Bluetooth connection procedure is checked according to a request of new user device registration. A disconnection procedure corresponding to the checked progress state is performed, and a pairing mode for the new user device registration is applied.

13 Claims, 7 Drawing Sheets

(56) References Cited

U.S. PATENT DOCUMENTS

2015/0327319 A1* 11/2015 Yae .................. H04W 76/028
 455/41.2
2015/0382195 A1* 12/2015 Grim .................. H04L 63/08
 726/4

FOREIGN PATENT DOCUMENTS

| KR | 10-2008-0104125 A | 12/2008 |
|---|---|---|
| KR | 2011-0006834 A | 1/2011 |
| KR | 10-2012-0111501 A | 10/2012 |
| KR | 10-2013-0114813 A | 10/2013 |

* cited by examiner

FIG. 1 -- Prior Art --
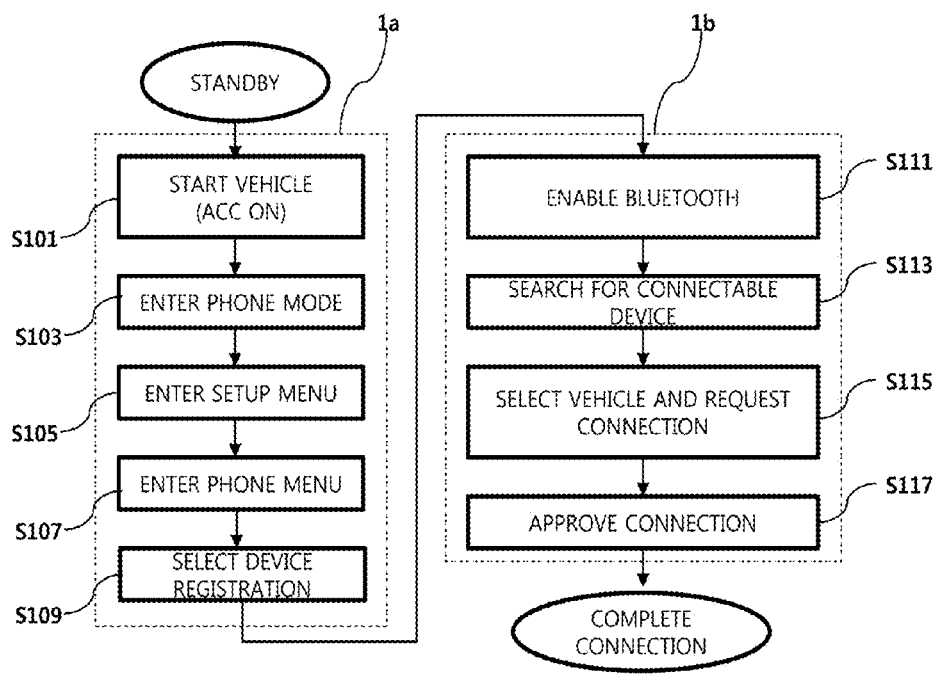
FIG. 2 -- Prior Art --
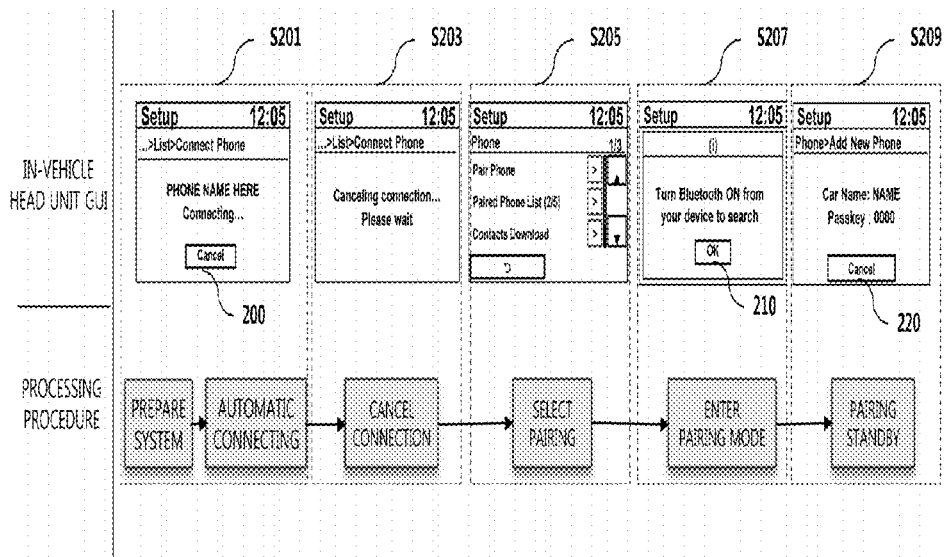

METHOD AND APPARATUS FOR REGISTERING NEW BLUETOOTH DEVICE

CROSS-REFERENCE TO RELATED APPLICATION

Pursuant to 35 U.S.C. §119(a), this application claims the benefit of earlier filing date and right of priority to Korean Application No. 10-2014-0082358, filed on Jul. 2, 2014, the contents of which are hereby incorporated by reference herein in its entirety.

TECHNICAL FIELD

The present disclosure relates to an in-vehicle Bluetooth pairing method, and more particularly, to a disconnection method for new Bluetooth device registration and a new device registration method.

BACKGROUND

Recent development of information technology (IT) has a great influence on the vehicle industry. Various IT technologies are involved in vehicles.

Particularly, a vehicle pairing technology, which is interlocked with a communication device such as a smartphone to provide various services, is receiving great attention.

Generally, when a vehicle starts, a Bluetooth function of an in-vehicle head unit having a Bluetooth hands-free function is automatically enabled, and as a result, the in-vehicle head unit enters a pairing standby mode. At this time, a driver selects a pairing operation of a menu in the in-vehicle head unit and the smartphone to perform a pairing operation. When the pairing operation is completed, the driver may have a telephone conversation in a hands-free state.

In-vehicle Bluetooth pairing operation is easily adapted as the result of generalization of the Bluetooth technology. However, users who are unskilled in the Bluetooth technology may have difficulty in performing such a complicated pairing procedure.

The in-vehicle Bluetooth pairing technology is connected directly with vehicle safety features and provides user convenience during driving. For these reasons, in North America, vehicles are available with Bluetooth.

The driver needs to manually perform a complicated pairing procedure, including registering a new phone for Bluetooth communication or deleting a registered phone, which inconveniences the driver.

Particularly, in a conventional Bluetooth technology, when it is necessary to connect a new device before connection to an existing device is completed, the connection to the existing device must be completed, the completed connection must be released, and the connection to the new device must be commenced. Completion of the Bluetooth connection means a final success or failure of the connection under progress.

Generally, Bluetooth communication is based on a point-to-point communication mode. Consequently, it is possible to connect several devices at once. In addition, when connection to the new device is attempted after the Bluetooth connection is commenced, completion of the existing connection under progress must be waited for. This is because, if the Bluetooth function of the in-vehicle head unit is disabled during connection or the connection under progress is canceled, a paired device may be in an abnormal state due to an unexpected phenomenon. In this case, the device may have difficulty in a subsequent attempt at connection.

A conventional in-vehicle Bluetooth pairing procedure will be described in brief with reference to FIGS. 1 and 2.

FIG. 1 is a view illustrating a conventional in-vehicle Bluetooth pairing procedure. Reference numeral 1a denotes a Bluetooth pairing procedure performed in an in-vehicle head unit, and reference numeral 1b denotes a Bluetooth pairing procedure performed in a user device.

Referring to reference numeral 1a, when a user starts a vehicle (i.e. ACC ON), in-vehicle head unit (H/U) starts an automatic Bluetooth pairing procedure (S101). At this time, the in-vehicle head unit enters a phone mode to attempt to pair with a designated or registered user device, e.g. a driver's smartphone (S103). In addition, a user interface screen showing that connection to a specific device may be attempted and displayed on a display screen of the in-vehicle head unit.

When the pairing procedure, which is automatically performed after starting of the vehicle, is canceled by the user, the in-vehicle head unit may sequentially enter a setup menu and a phone menu to configure and display a user interface screen, including a menu for registering a new user device or selecting one of registered user devices, which will hereinafter be referred to as a "device registration selection screen" for the convenience of description (S105 to 109). At this time, the user may designate a user device for pairing according to a menu selection on the device registration selection screen. In addition, a guide message indicating enablement of a Bluetooth function of the user device for pairing may be displayed on the display screen of the in-vehicle head unit.

Referring to reference numeral 1b, a Bluetooth function may be enabled according to a guide message displayed on a screen of the user device (S111).

When the Bluetooth function of the user device is enabled by the user, the user device may search for surrounding devices that are capable of performing Bluetooth pairing and display the search result on the screen (S113).

When the user selects a vehicle based on the search result, the user device transmits a connection request signal to the selected vehicle (S115). At this time, a passkey input screen for inputting a passkey value corresponding to the selected vehicle may be displayed on the screen of the user device.

Upon receiving the connection request signal from the user device, the in-vehicle head unit may display vehicle information and the passkey value on the screen.

When the passkey value is input to the passkey input screen, the user device transmits the passkey value to the in-vehicle head unit. Determining that the received passkey value is identical to a passkey value of the in-vehicle head unit, the in-vehicle head unit may transmit a approval completion message indicating that the connection request has been approved to the user device (S117).

FIG. 2 is a view illustrating a user interface screen output to the in-vehicle head unit during the conventional Bluetooth pairing procedure.

Referring to FIG. 2, when the user starts the vehicle and an automatic pairing procedure starts, the in-vehicle head unit may output an automatic connection screen informing that Bluetooth connection to a specific user device is being performed (S201).

At this time, when the user clicks a cancel button 200 on the automatic connection screen to cancel the automatic pairing, the in-vehicle head unit may display a screen for registering or selecting a device for pairing (S203 and S205).

Subsequently, when the device for pairing is designated by the user, the in-vehicle head unit may display a Bluetooth connection guide message indicating enablement of a Bluetooth function of the designated device on the screen (S207).

At this time, the user may enable the Bluetooth function of the designated device according to the Bluetooth connection guide message.

Subsequently, when the user clicks an OK button 210, the in-vehicle head unit displays a vehicle name and a passkey value to be used to register a new device on the screen and enters a pairing standby state (S209). When a cancel button 220 is selected in the pairing standby state, the in-vehicle head unit may finish the pairing procedure.

In another example, a conventional in-vehicle Bluetooth pairing method using a pairing application may be used.

The user may download a pairing application from the internet and install the pairing application in the user device. The pairing procedure is substantially identical to the in-vehicle Bluetooth pairing procedure shown in FIGS. 1 and 2. When the pairing application is driven, however, devices registered by the pairing application and available devices, such as a vehicle, a Bluetooth headset, a smartphone, and a mobile phone, are searched, and the user may select and add the available devices to a registered device list.

In the in-vehicle Bluetooth pairing method using the pairing application, however, the pairing application must be downloaded and installed in the user device. Furthermore, the pairing application may not be compatible with all devices. For example, a specific pairing application may be operated only in devices based on an Android operation system. In addition, the number of the user manipulation steps for pairing in the in-vehicle head unit is not reduced even with the pairing application.

When the vehicle driver wishes to perform Bluetooth pairing with a new user device after starting the vehicle as described above, it is necessary to sequentially perform the step of entering the phone mode on the in-vehicle head unit, the step of canceling the automatic pairing procedure, the step of entering the setup menu, the step of entering the phone menu, and the step of selecting the device for pairing.

In order to prevent the above problems, therefore, the conventional Bluetooth communication is designed, such that after pairing completed, a user directly disconnects the device and then commences a new device registration procedure.

SUMMARY

The present disclosure is directed to a Bluetooth pairing method for an in-vehicle head unit that substantially obviate one or more problems due to limitations and disadvantages of the related art.

An aspect of the present inventive concept provides a disconnection method for new device registration in an in-vehicle head unit and a new device registration method.

Another aspect of the present inventive concept provides a new Bluetooth device registration method that is capable of adaptably disconnecting Bluetooth connection based on a progress state of the Bluetooth connection during registration of a new device and registering a new device.

Another aspect of the present inventive concept provides a new Bluetooth device registration method that is capable of minimizing a new device registration procedure in an in-vehicle head unit to more rapidly and safely register a new device.

Another aspect of the present inventive concept provides a new Bluetooth device registration method that is capable of safely interrupting Bluetooth connection according to a user's desire while maintaining compatibility and safety.

A further aspect of the present inventive concept provides a new Bluetooth device registration method that is capable of displaying an add new softkey for new device registration on a user notification screen at an automatic Bluetooth pairing step to register a new device without a user's selection of an additional menu.

Additional advantages, objects, and features of the invention will be set forth in part in the description which follows and in part will become apparent to those having ordinary skill in the art upon examination of the following or may be learned from practice of the inventive concept. The objectives and other advantages of the inventive concept may be realized and attained by the structure particularly pointed out in the written description and claims hereof as well as the appended drawings.

To achieve these aspects and other advantages and in accordance with the purpose of the inventive concept, as embodied and broadly described herein, the present disclosure provides an in-vehicle Bluetooth pairing method and an apparatus for performing the same. Specifically, the present invention provides a method of registering a new device during execution of an automatic Bluetooth connection procedure and an apparatus for performing the same.

According to an exemplary embodiment of the present inventive concept, a Bluetooth pairing method in an in-vehicle head unit includes commencing an automatic Bluetooth connection procedure with a first user device when power is supplied to the in-vehicle head unit. A progress state of the commenced automatic Bluetooth connection procedure is checked according to a request of new user device registration. A disconnection procedure corresponding to the checked progress state is performed, and a pairing mode for the new user device registration is applied.

The first user device may be a user device having Bluetooth paired with the in-vehicle head unit before commencement of the automatic Bluetooth connection procedure.

The Bluetooth pairing method may further include displaying an automatic connection screen including a notification message notifying that the automatic Bluetooth connection procedure is being performed and an add new button for requesting the new user device registration on a screen of the in-vehicle head unit.

The Bluetooth pairing method may further include checking the progress state of the commenced automatic Bluetooth connection procedure when the add new button is selected.

The automatic connection screen may be cancelled if the add new button is not selected.

The progress state may include a state in which a link is connected and a state in which a profile is connected.

The Bluetooth pairing method may further include, completing connection of the link and then disconnecting the link which is connected when the checked progress state is the state in which the link is connected.

The Bluetooth pairing method may further include, completing connection of the profile which is connected and then disconnecting the profile which has been connected and the link which has been connected when the checked progress state is the state in which the profile is connected. Connection of the profile is completed when the checked progress state is the state in which the profile is connected. When there is a profile in a connection standby state, the profile which has been connected and the link which has been connected are disconnected without attempting to connect the profile in a connection standby state.

The Bluetooth pairing method may further include, upon receiving a connection request from a second user device in the checked progress state, rejecting the connection request.

In another exemplary embodiment of the present inventive concept, a user interface screen display method for Bluetooth pairing in an in-vehicle head unit includes displaying a first user interface screen including a notification message notifying that an automatic Bluetooth connection procedure is being performed and an add new button for requesting new user device registration when power is applied to the in-vehicle head unit. A second user interface screen is displayed including a notification message notifying that the automatic Bluetooth connection procedure is canceled when the add new button is selected. A third user interface screen is displayed including a notification message indicating enablement of a Bluetooth function of a user device when the automatic Bluetooth connection procedure is cancelled. A fourth user interface screen is displayed including a passkey value according to a connection request form the user device.

The first user interface screen may further include a cancel button for canceling the commenced automatic Bluetooth connection procedure.

The fourth user interface screen may further include a cancel button for canceling the connection request form the user device.

In another exemplary embodiment of the present inventive concept, an in-vehicle head unit having a Bluetooth function includes a Bluetooth module configured to perform Bluetooth communication with an external user device. An in-vehicle communication module is configured to communicate with an electronic control unit (ECU) of a vehicle. A signal detection module is configured to detect a received signal strength indicator (RSSI) and to measure a strength of the detected signal. A controller is configured to apply the power to the in-vehicle head unit and to commence an automatic pairing procedure. A memory is configured to store programs for operating the controller and temporarily store input/output data. A power supply is configured to supply power to operate the in-vehicle head unit.

The in-vehicle head unit may further include an output for displaying an automatic connection screen including a notification message notifying that the automatic Bluetooth connection procedure is being performed and an add new button for requesting the new user device registration.

The automatic connection screen may further include a cancel button for interrupting the commenced automatic Bluetooth connection procedure.

The progress state may include a state in which a link is connected and a state in which a profile is connected.

When the progress state is the state in which the link is connected, the controller may be configured to complete the connection of the link which is connected and then disconnect the link which is connected.

When the checked progress state is the state in which the profile is connected, the controller may be configured to complete the connection of the profile which is connected and then disconnect the profile which is connected and the link which is connected.

When there is a profile in a connection standby state, the controller may be configured to disconnect the profile which has been connected and the link which is connected without attempting to connect the profile in a connection standby state.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment/s/ of the invention and together with the description serve to explain the principle of the invention.

FIG. 1 is a view illustrating a conventional in-vehicle Bluetooth pairing procedure.

FIG. 2 is a view illustrating a user interface screen output to an in-vehicle head unit during the conventional Bluetooth pairing procedure.

DETAILED DESCRIPTION

Reference will now be made in detail to exemplary embodiments of the present disclosure, examples of which are illustrated in the accompanying drawings. The suffixes "module" and "unit" of elements herein are used for convenience of description, and thus can be used interchangeably and do not have any distinguishable meanings or functions.

Although all elements constituting the embodiments of the present disclosure are described to be integrated into a single one or to be operated as a single one, the present disclosure is not necessarily limited to such embodiments. According to embodiments, all of the elements may be selectively integrated into one or more and be operated as one or more within the aspect and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present disclosure pertains. The computer program may be stored in a computer readable media such that the computer program is read and executed by a computer to implement embodiments of the present inventive concept. Computer program storage media may include magnetic recording media, optical recording media, and carrier wave media.

The term "comprises," "includes," or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not interpreted as ideal or excessively formal meanings.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to," "coupled to," or "accessed to" another element, one element may be "connected to," "coupled to," or "accessed to" another element via a further element although one element may be directly connected to or directly accessed to another element.

Figure 3:
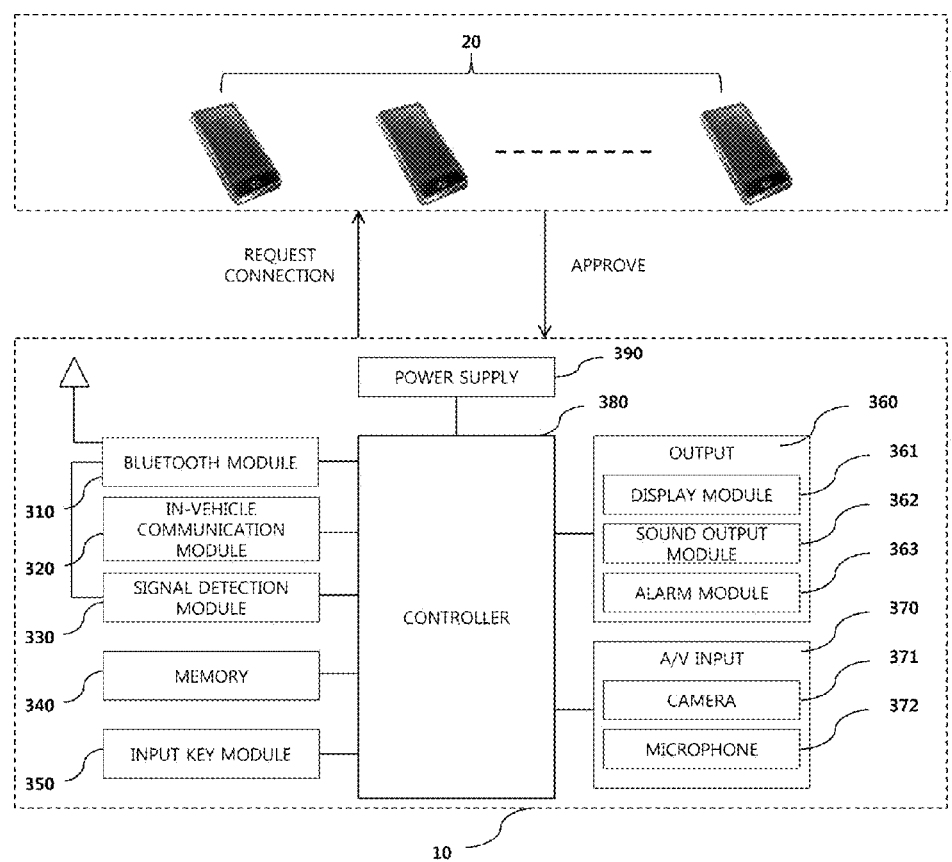
FIG. 3 is a view showing a configuration of an in-vehicle Bluetooth pairing system according to an embodiment of the present inventive concept.

FIG. 3 is a view showing a configuration of a Bluetooth pairing system according to an embodiment of the present inventive concept.

As shown in FIG. 3, the pairing system may include an external user device 20 and an in-vehicle head unit 10.

The in-vehicle head unit 10 may include a Bluetooth module 310, an in-vehicle communication module 320, a signal detection module 330, a memory 340, an input key module 350, an output 360, an audio/video (A/V) input 370, a controller 380, and a power supply 390.

The Bluetooth module 310 may include a baseband module for processing a baseband signal according to a Bluetooth standard. A power amplifier amplifies the baseband signal. A band pass filter (BPF) converts the amplified baseband signal into a transmission frequency band or passes a signal having a desired frequency band selected from among radio frequency (RF) signals received through an antenna. A low noise amplifier amplifies the band-passed RF signal to be easily recognized and transmits the RF signal to the baseband module. The antenna transmits and receives the RF signal.

In addition, the Bluetooth module 310 may perform Bluetooth communication with the user device, a Bluetooth function of which has been enabled. For example, the Bluetooth module 310 may receive a connection request message from the user device 20 and transmit the connection request message to the controller 380.

The in-vehicle communication module 320 communicates with an electronic control unit (ECU) of the vehicle. For example, when the vehicle starts, the in-vehicle communication module 320 may receive a control signal indicating ACC ON from the ECU that senses starting of the vehicle and transmits the control signal to the controller 380. The controller 380 may apply power to the in-vehicle head unit and commence an automatic pairing procedure.

The signal detection module 330 may detect a received signal strength indicator (RSSI) transmitted from an external device and measure strength of the detected signal. In addition, the signal detection module 330 may select and sort the user device 20 that can be paired based on the strength of the detected signal and transmit the user device 20 to the controller 380. At this time, the signal detection module 330 may transmit an RSSI read command to a link management protocol (LMP) layer, which is a protocol layer that performs a link setup between Bluetooth devices, of the Bluetooth module 310 to acquire an RSSI value of a signal received from the user device 20. At this time, the RSSI value may be detected only when a discoverable mode of the user device 20 is enabled. The discoverable mode may be set through a selection of a predetermined menu of the user device 20.

In addition, the signal detection module 330 may acquire address information, which includes at least one selected from a unique Bluetooth address uniquely assigned to a corresponding device and a media access control (MAC) address assigned to the corresponding device, corresponding to the RSSI-detected user device 20 and store the address information together with the detected RSSI level. At this time, the address information may be arranged in high order of the RSSI value and stored in the memory 340.

In addition, the signal detection module 330 may be controlled to detect the RSSI for a defined number of user devices 20.

Generally, Bluetooth enables both data communication sensible to delay time, such as voice or audio, and packet data communication performed at high speed and insensible to delay time.

Two different links are defined between two Bluetooth devices to transmit such data. A synchronous connection oriented (SCO) link may be set for the voice communication sensible to the delay time and an asynchronous connectionless link (ACL) may be set for the packet data communication insensible to the delay time.

The signal detection module 330 may recognize the number of user devices 20, the RSSI of which is to be detected, according to a predetermined maximum ACL link value.

For example, when the maximum ACL link (Max ACL Link) value is set to 5, the signal detection module 330 may detect the RSSI for maximum of 5 user devices 20.

The memory 340 may store programs for operating the controller 380 and lower modules controlled by the controller 380 and temporarily store input/output data (for example, an address book, messages, still images, videos, and application programs). The application programs may include programs for navigation, games, chatting, web surfing, schedule management, and multimedia reproduction.

In particular, the memory 340 may store an application program for Bluetooth pairing and address information of the user devices 20 arranged according to RSSI strength.

In addition, the memory 340 may store data on various vibration and sound patterns output at the time of touch input on a touchscreen.

The memory 340 may include at least one selected from among a flash memory, a hard disk memory, a multimedia card micro memory, a card memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The input key module 350 generates input data for controlling operation of the in-vehicle head unit 10. The input key module 350 may include a key pad, a dome switch, a touch pad (static pressure/electrostatic), a jog wheel, and a jog switch.

The output 360 generates an output relevant to a sense of sight, hearing, or touch. The output 360 may include a display module 361, a sound output module 352, and an alarm module 363.

The display module 361 displays or outputs information processed by the in-vehicle head unit 10. For example, when the in-vehicle head unit 10 is in a telephone conversation mode, the display module 361 displays a user interface (UI)

or graphical user interface (GUI) related to telephone conversation. On the other hand, when the in-vehicle head unit 10 is in a navigation mode, the display module 361 displays a user interface (UI) or graphical user interface (GUI) related to travel guide.

In particular, the display module 361 may configure and display information regarding an automatic connection progress state in the automatic Bluetooth connection mode and information regarding a pairing progress state and a pairing-related menu in the pairing mode as a user interface (UI) or graphical user interface (GUI).

For example, the display module 361 may include a function of displaying an automatic connection screen including a notification message notifying that an automatic Bluetooth connection procedure is being performed and an add new button for requesting registration of a new user device. A function of displaying a second user interface screen includes a notification message notifying that the automatic Bluetooth connection procedure is canceled when the add new button is selected. A function of displaying a third user interface screen includes a notification message indicating to enablement of a Bluetooth function equipped in the user device when the automatic Bluetooth connection procedure is canceled. A function of displaying a fourth user interface screen includes a vehicle name and a passkey value according to a connection request form the user device.

The display module 361 may include at least one selected from the group consisting of a liquid crystal display, a thin film transistor-liquid crystal display, an organic light-emitting diode, a flexible display, and a three-dimensional (3D) display.

According to configuration of the in-vehicle head unit 10, two or more display modules 361 may be provided. For example, the display modules 361 may be separately or integrally disposed at one side of the in-vehicle head unit 10. Alternatively, the display modules 361 may be disposed at the opposite side of the in-vehicle head unit 10.

When the display module 361 and a sensor for sensing a touch (hereinafter, referred to as a "touch sensor") constitute a mutual layer structure (hereinafter, simply referred to as a "touchscreen"), the display module 361 may be used as an input device in addition to an output device.

The touch sensor may be configured as a touch film, a touch sheet, or a touchpad.

The touch sensor may be configured to convert pressure applied to a specific portion of the display module 361 or change of capacitance generated from a specific portion of the display module 361 to an electric input signal. The touch sensor may be configured to sense pressure of a touch as well as a touched position or area.

When a touch input is made to the touch sensor, a signal(s) corresponding to the touch is transmitted to a touch controller. The touch controller processes the signal(s) and then transmits data corresponding to the processed signal(s) to the controller 380. Therefore, the controller 380 may recognize which portion of the display module 361 has been touched.

The sound output module 362 may output audio data received from the Bluetooth module 310 or stored in the memory 340 in a call signal reception mode, a telephone conversation mode, a recording mode, a speech recognition mode, or a pairing mode. The sound output module 362 outputs a sound signal related to a function (e.g. a call signal reception sound, a message reception sound, or a pairing completion sound) performed by the in-vehicle head unit 10. The sound output module 362 may include a receiver, a speaker, and a buzzer. In addition, the sound output module 362 may output sound through an earphone jack provided at one side of the in-vehicle head unit 10.

The alarm module 363 outputs signals for notifying that events have been generated in the in-vehicle head unit 10. Examples of events generated in the in-vehicle head unit 10 may include call signal reception, message reception, key signal input, touch input, and reception of vehicle state information from the in-vehicle communication module 320. The vehicle state information may include door opening information, engine overheating information, lane deviation information, and fuel state information. The alarm module 363 may output other different signals, such as vibration signals for notifying of event generation, in addition to video signals or audio signals. The video signals or the audio signals may also be output through the display module 361 or the sound output module 362.

The A/V input 370 is provided to input audio signals or video signals. The A/V input 370 may include a camera 371 and a microphone 372.

The camera 371 processes image frames, such as still images or videos, acquired by an image sensor in a video conversation mode or in a capturing mode. The processed image frames may be displayed on the display module 361. In addition, the camera 371 may capture images behind the vehicle when the vehicle moves backward. The captured images may be output through the display module 361.

The image frames processed by the camera 371 may be stored in the memory 340 or transmitted to a paired user device 20 via the Bluetooth module 310.

According to configuration of the in-vehicle head unit 10 and the vehicle, two or more cameras 371 may be provided.

The microphone 372 receives external sound signals and converts the received sound signals into electrical speech data in a telephone conversation mode, a recording mode, or a speech recognition mode. In the telephone conversation mode, the converted speech data may be transmitted to the paired user device 20 through the Bluetooth module 310.

The power supply 390 supplies power necessary to operate the in-vehicle head unit 10. When the vehicle is powered ON, the power supply 390 may automatically supply power to the in-vehicle head unit 10. When the vehicle is powered OFF, the power supply 390 may automatically interrupt the supply of power to the in-vehicle head unit 10.

The controller 380 generally controls overall operation of the in-vehicle head unit 10. For example, the controller 380 may control a communication function including speech communication using Bluetooth pairing, data communication, and video communication. In addition, the controller 380 may control an application program to be installed and driven.

In addition, the controller 380 may perform pattern recognition processing that is capable of recognizing a writing input or a drawing input performed on the touchscreen as text and images.

In particular, the controller 380 may control input and output operations according to various control signals received from the lower modules and provide a user interface screen based thereupon. The lower modules may include the Bluetooth module 310, the in-vehicle communication module 320, the signal detection module 330, the memory 340, the input key module 350, the output 360, the A/V input 370, and the power supply 390 as previously described.

The controller 380 may provide: a means for commencing an automatic Bluetooth connection procedure with a registered first user device when power is applied; a means for checking a progress state of the automatic Bluetooth connection procedure according to a request for new user device registration; a means for performing a disconnection procedure corresponding to the checked progress state; and a means for switching to a pairing mode for the new user device registration.

In addition, the controller 380 may adaptively perform the disconnection procedure according to the checked progress state. The progress state may include a state in which a link is connected and a state in which a profile is connected.

When the checked progress state is the state in which the link is connected, the controller 380 may complete connection of the link which is connected and disconnect the link which has been connected.

When the checked progress state is the state in which the profile is connected, the controller 380 may complete connection of the profile which is connected and then disconnect the profile which has been connected and the link which has been connected.

As another example, when the checked progress state is a state in which the profile is connected, the controller 380 completes the connection of the profile which is connected, and then, checks whether there is a profile in a connection standby state. Upon checking that there is a profile in a connection standby state, the controller 380 may disconnect the profile which has been connected and the link which has been connected without attempting to connect the profile in a connection standby state.

In addition, upon receiving a connection request from the second user device in the state in which the link is connected or in the state in which the profile is connected, the controller 380 may ignore the connection request and enter the pairing mode to control the new user device to be registered.

The controller 380 may be implemented with one or more microprocessors executed by a program stored in a non-transitory computer-readable medium. The program may include a series of commands for performing each step included in a method of controlling an outgoing call in a vehicle having a voice recognition function according to an exemplary embodiment of the present inventive concept.

Figure 4:
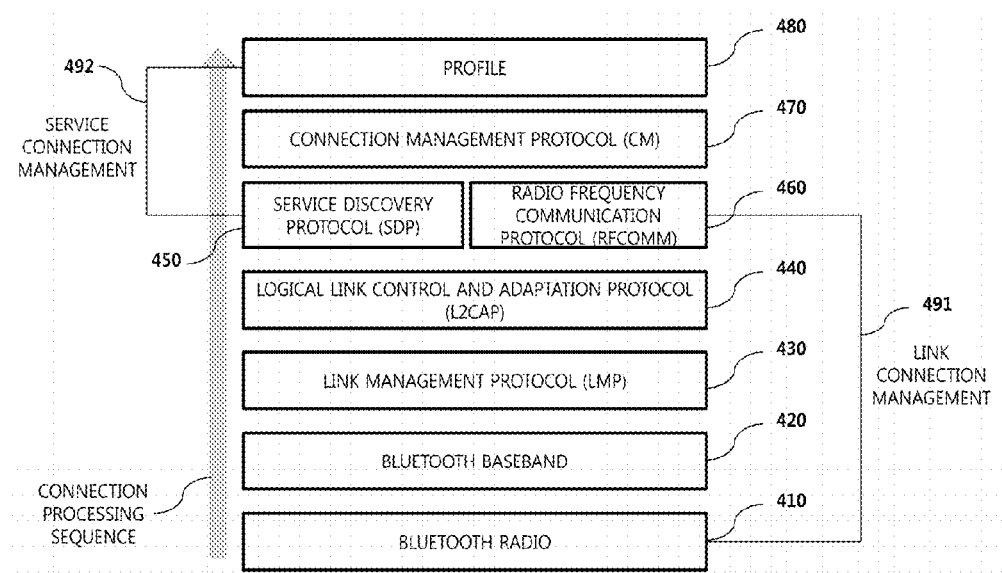
FIG. 4 is a view illustrating a Bluetooth protocol stack according to an embodiment of the present inventive concept.

FIG. 4 is a view illustrating a Bluetooth protocol stack according to an embodiment of the present inventive concept.

Referring to FIG. 4, the Bluetooth protocol stack may include a Bluetooth radio layer 410, a Bluetooth baseband layer 420, a link management protocol (LMP) layer 430, a logical link control and adaptation protocol (L2CAP) layer 440, a service discovery protocol (SDP) layer 450, a radio frequency communication protocol (RFCOMM) layer 460, a connection management protocol layer 470, and a profile layer 480.

The Bluetooth radio layer 410 converts a radio signal having an industrial scientific and medical (ISM) frequency band of 2400 to 2483.5 MHz into a baseband and transmits the converted signal to the Bluetooth baseband layer 420 through the antenna or converts the baseband signal received from the Bluetooth baseband layer 420 into an ISM frequency band and transmits the converted signal to an upper-level layer.

The Bluetooth baseband layer 420 modulates data received from the upper-level layer and transmits the modulated data to the Bluetooth radio layer 410 or demodulates the baseband signal received from the Bluetooth radio layer 410 and transmits the demodulated signal to the upper-level layer. At this time, frequency shift keying (FSK), phase shift keying (PSK), or quadrature amplitude modulation (QAM) may be used as a modulation method.

The link management protocol layer 430, which is firmware-level software for directly controlling baseband hardware, perform a piconet management function, a link management function, and an encryption management function.

The piconet management function includes: a function of managing connection to or disconnection from a slave device; a function of switching between a master device and the slave device; a function of connection between the synchronous connection oriented (SCO) link and the asynchronous connection-less (ACL) link; and a power mode management function. The ACL link is a type of Bluetooth data link. In exchange of a packet between two devices, the ACL link operates in an asynchronous mode. Consequently, the ACL link is used to connect general data communication excluding a voice channel. On the other hand, the SCO link is used for synchronous data transmission. The SCO link is generally used for voice communication.

The link management function includes a function of managing service quality related to a data transmission rate and error rate and a power control function.

The encryption management function includes a function related to authentication and encryption.

The logical link control and adaptation protocol layer 440 is connected to the Bluetooth baseband layer 420 to provide a logical channel for the upper-level layer. The logical channel means a virtual channel set to transmit data received from the upper-level layer or an application layer to the lower-level layer or to transmit data received from the lower-level layer to the upper-level layer. In particular, the logical link control and adaptation protocol layer 440 performs functions of multiplexing, demultiplexing, segmenting, and reassembling data transmitted and received between the upper-level layer and the Bluetooth baseband layer 420.

The service discovery protocol layer 450 provides a protocol for exchanging information regarding the features of a service available in a connected Bluetooth device. The service discovery protocol layer 450 operates based on a server-client architecture. At this time, a universally unique identifier (UUID) may be assigned to each service. The server device may manage a list of available services and the details of each service in the form of a database. The client device may request and acquire information related to the corresponding service from the server.

The radio frequency communication protocol layer 460 emulates an RS-232 9 pin serial port based on TS 07.10 of European Telecommunications Standards Institute (ETSI). The radio frequency communication protocol layer 460 may be used in the following two types of devices. One is Type 1 device in which two devices are directly connected to each other via a Bluetooth link as ends over communication, and the other is Type 2 device in which one device is an end and the other is a portion of another network.

The connection management protocol layer 470 is software of the in-vehicle head unit for managing connection to each profile (service).

The profile layer 480 maintains and manages detailed information regarding various services provided through Bluetooth communication. For example, profiles (services) that can be provided through the Bluetooth communication may include a headset profile), a LAN connection profile, a file transfer profile), a hands-free telephone profile), and an advanced audio distribution profile (A2DP).

Referring to FIG. 4, two connection management procedures may be performed at the time of registering a new device for Bluetooth communication. One is a link connection management procedure 491 and the other is a service connection management procedure 492.

The link connection management procedure 491 is performed between the Bluetooth radio layer 410 and the service discovery protocol layer 450, and the service connection management procedure 492 is performed between the service discovery protocol layer 450 and the profile layer 480.

As shown in FIG. 4, the Bluetooth connection procedure includes the link connection management procedure 491 and the service connection management procedure 492, which are sequentially performed.

For example, upon receiving a connection (service) request message from the user device 20 during the link connection management procedure 491 according to the new device registration request, the in-vehicle head unit 10 may reject the connection request message and control the connection procedure for the corresponding service request not to be performed any longer. Upon not receiving a connection request message during the link connection management procedure 491 according to the new device registration request, the in-vehicle head unit 10 may release Bluetooth communication connection, which includes link connection and service connection. The link connection is performed through message communication among the link management protocol layer 430, the logical link control and adaptation protocol layer 440, and the service discovery protocol layer 450.

In addition, the in-vehicle head unit 10 connects services searched by the service discovery protocol layer 450 during the service connection in predetermined sequence. At this time, the in-vehicle head unit 10 stores the connection sequence of the services and monitors a connection request from the user device 20. Upon monitoring that the new device registration has been requested by the user, the vehicle head unit 10 completes only the connection procedure for the service which is currently being performed and then releases all of the services that have been connected up to now. Subsequently, upon receiving a connection request from another user device 20, the in-vehicle head unit 10 may ignore the connection request and control the new device registration procedure requested by the user to be commenced.

Figure 5:
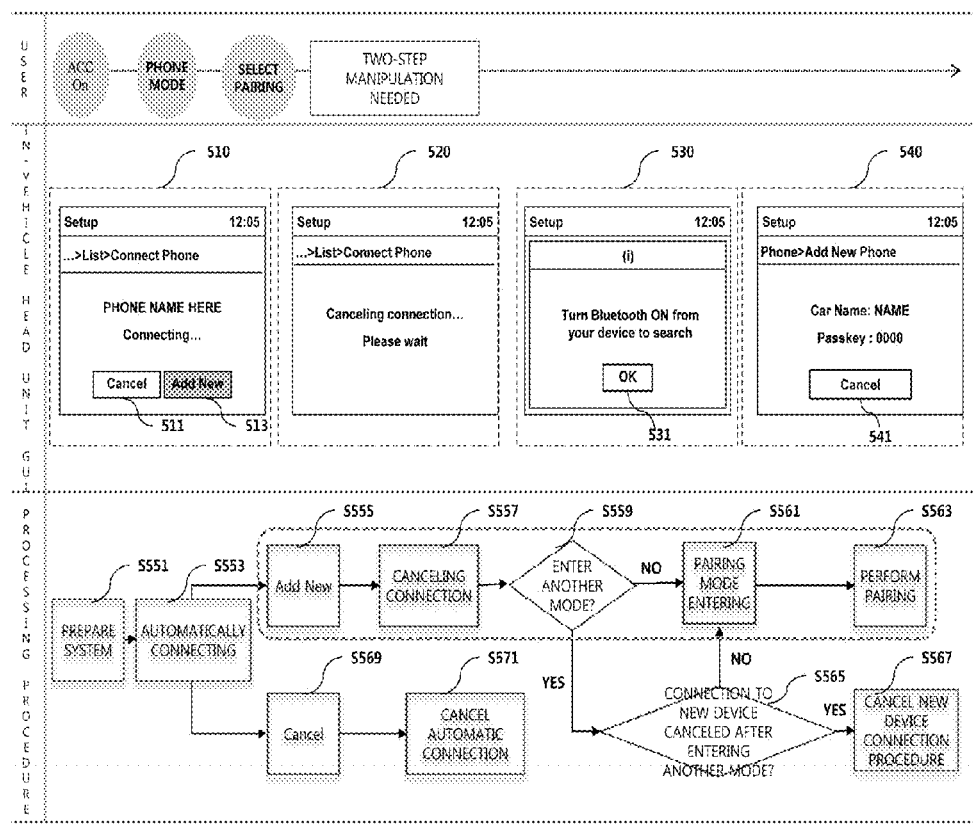
FIG. 5 is a view illustrating a Bluetooth pairing procedure in an in-vehicle head unit according to an embodiment of the present inventive concept.

FIG. 5 is a view illustrating a Bluetooth pairing procedure in an in-vehicle head unit according to an embodiment of the present inventive concept.

Referring to FIG. 5, when the vehicle starts, the user may enter a phone mode and select pairing through a menu selection on a user interface screen of the in-vehicle head unit 10 to register a new device for Bluetooth communication.

A new user device registration procedure performed by the in-vehicle head unit 10 will be described in detail with reference to a user interface screen displayed on the in-vehicle head unit 10.

When the user starts the vehicle and enters the phone mode (S551), the in-vehicle head unit 10 performs an automatic pairing procedure (S553). At this time, the in-vehicle head unit 10 configures and displays a first user interface screen 510. The first user interface screen 510 may include information regarding a user device which is connected, a cancel button 511, and an add new button 513.

When the add new button 513 is selected by the user (S555), the in-vehicle head unit 10 commences a procedure of canceling the currently being attempted connection (S557), and checks whether the in-vehicle head unit 10 enters another mode (S559). At this time, the in-vehicle head unit 10 may configure and display a second user interface screen 520 including a notification message indicating that the pairing procedure, connection of which is being attempted, is canceled.

When the in-vehicle head unit 10 is not requested to enter another mode during canceling of the connection, the in-vehicle head unit 10 enters a pairing mode for new user device registration (S561) and performs a pairing procedure to a new user device (S563).

At this time, the in-vehicle head unit 10 may configure and display a third user interface screen 530 including a notification message indicating to enable a Bluetooth function of the user device 20 for user device search and an OK button 531.

Subsequently, the user may enable the Bluetooth function of the user device 20 and then select the OK button 531. At this time, upon receiving a connection request message from the user device 20, the in-vehicle head unit 10 may configure and display a fourth user interface screen 540 including a vehicle name and a passkey value preset for the in-vehicle head unit 10. The fourth user interface screen 540 may further include a cancel button 541 for canceling the connection request.

Upon checking a request for entering another mode during canceling of the connection at step S559, the in-vehicle head unit 10 enters the requested mode and checks whether canceling of the new user device registration (pairing) has been requested (S565).

When the in-vehicle head unit 10 enters the requested mode and the connection (pairing) with the new user device is canceled, the in-vehicle head unit 10 cancels the connection procedure to the new user device (S567).

When the cancel button 11 is selected by the user (S569), the in-vehicle head unit 10 cancels the automatic pairing procedure (S571).

When the in-vehicle head unit 10 enters the requested mode and the connection (pairing) with the new user device is not canceled at step S565, the in-vehicle head unit enters the pairing mode for the new user device registration (S561).

Figure 6:
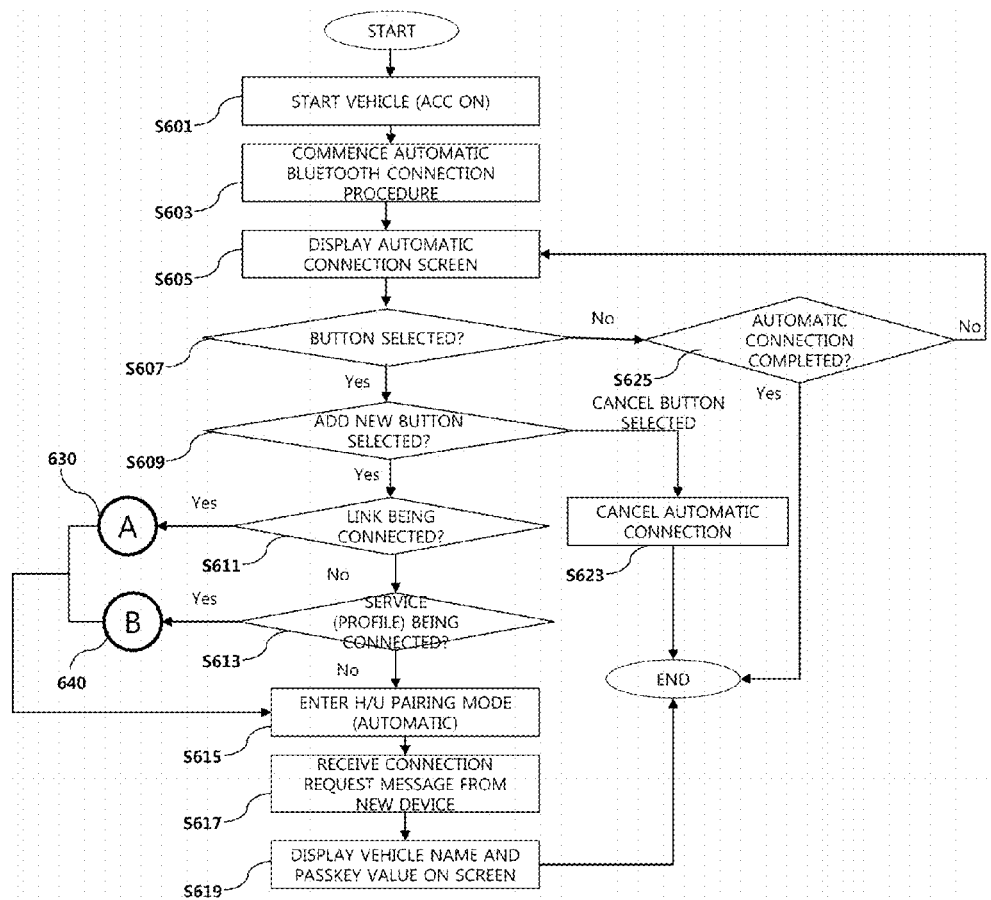
FIGS. 6 to 8 are flowcharts illustrating a Bluetooth pairing method in an in-vehicle head unit according to an embodiment of the present inventive concept.

FIG. 6 is a flowchart illustrating a Bluetooth pairing method in an in-vehicle head unit according to an embodiment of the present inventive concept.

Referring to FIG. 6, when the vehicle starts and power is supplied to the in-vehicle head unit 10 (S601), the in-vehicle head unit 10 commences an automatic Bluetooth connection procedure to a first user device 20 (S603). The first user device 20 may be a user device that has been previously Bluetooth paired.

At this time, the in-vehicle head unit 10 may display an automatic connection screen including a notification message indicating that the automatic Bluetooth connection procedure to the corresponding user device is being performed, a cancel button 511 for canceling the automatic Bluetooth connection procedure which is being performed, and an add new button 513 for new user device registration (S605).

When one of the buttons has been selected (S607), the in-vehicle head unit 10 checks whether the add new button 513 has been selected (S609).

When the add new button 513 is selected, the in-vehicle head unit 10 checks whether the automatic Bluetooth connection procedure which is being performed is a link connection management procedure, i.e. a link is connected (S611).

Upon checking that the link connection is being performed, the in-vehicle head unit 10 performs procedure 'A' 630.

Upon checking at step S611 that the link connection is not being performed, the in-vehicle head unit 10 checks whether the automatic Bluetooth connection procedure which is being performed is a service (profile) connection management procedure, i.e. a service (profile) is connected (S613).

Upon checking that the service (profile) connection is being performed, the in-vehicle head unit 10 performs procedure 'B' 640.

Upon checking at step S613 that the service (profile) connection is not being performed, the in-vehicle head unit 10 automatically enters a pairing mode (S615).

Subsequently, upon receiving a connection request message from the new user device (S617), the in-vehicle head unit 10 displays a vehicle name and a passkey value on the screen (S619). The user checks the vehicle name displayed on the screen and performs a connection approval procedure using the passkey value on a user device to be newly registered to complete a registration procedure for the new user device.

When the add new button 513 is not selected at step S609, i.e. the cancel button 511 has been selected, the in-vehicle head unit 10 cancels the automatic connection procedure which is being performed (S623).

When the button has not been selected at step S607, the in-vehicle head unit 10 checks whether the automatic connection procedure is completed (S625). Upon checking that the automatic connection procedure is not completed, the in-vehicle head unit 10 returns to step S605.

Figure 7:
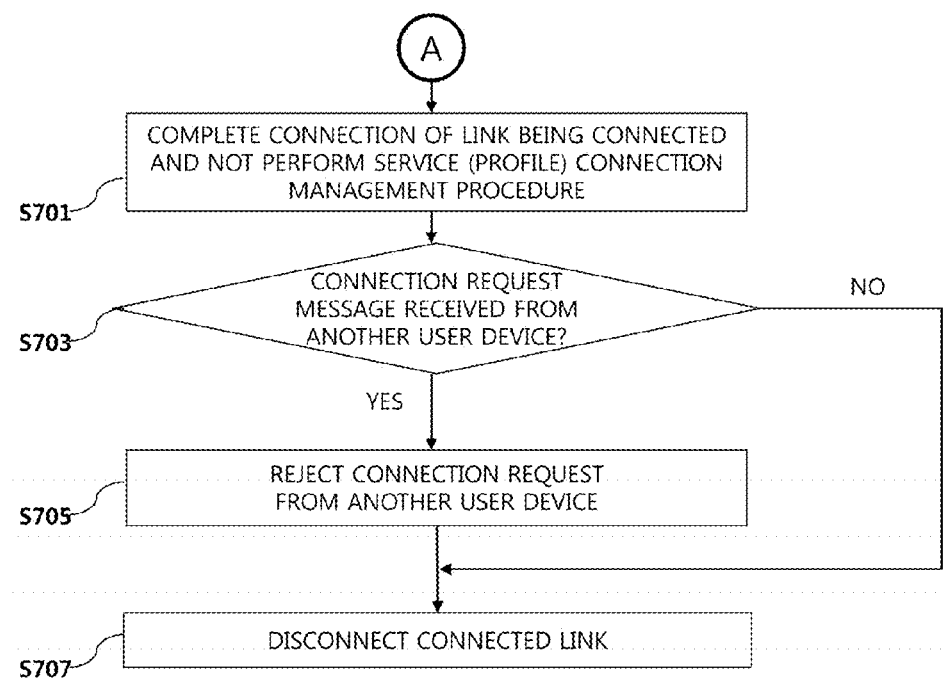

FIG. 7 is a flowchart illustrating procedure 'A' of FIG. 6.

Referring to FIG. 7, when the connection of the link which is connected is completed, the in-vehicle head unit 10 does not perform a service (profile) connection management procedure (S701).

Subsequently, the in-vehicle head unit 10 checks whether a connection request message has been received from another user device (S703).

Upon checking that the connection request message has been received, the in-vehicle head unit 10 rejects the connection request from the corresponding user device (S705) and performs a procedure of disconnecting the link (S707), the connection of which has been completed at step S701.

Upon checking at step S703 that the connection request message has not been received, the in-vehicle head unit 10 performs a procedure of disconnecting the link, the connection of which has been completed at step S701.

Figure 8:
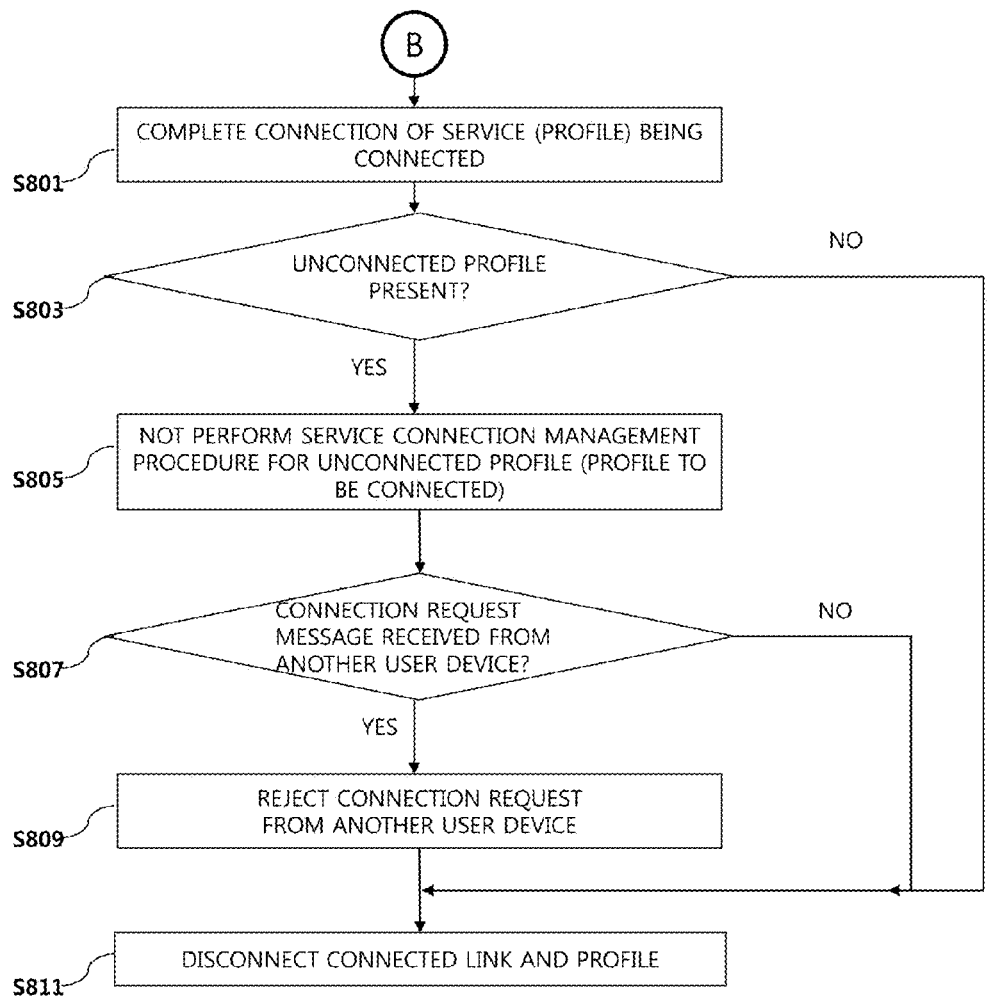

FIG. 8 is a flowchart illustrating procedure 'B' of FIG. 6.

Referring to FIG. 8, when the connection of the service (profile) which is connected is completed (S801), the in-vehicle head unit 10 checks whether an unconnected profile is present (S803). The unconnected profile means a service in a connection standby state.

Upon checking that the unconnected profile is present, the in-vehicle head unit 10 does not perform a service connection management procedure for the unconnected profile (S805).

Subsequently, the in-vehicle head unit 10 checks whether a connection request message has been received from another user device (S807).

Upon checking that the connection request message has been received, the in-vehicle head unit 10 rejects the connection request from the corresponding user device (S809) and performs a procedure of disconnecting the link and the service (profile) (S811), the connection of which has been completed.

Upon checking at step S803 that no unconnected profile is present, the in-vehicle head unit 10 performs a procedure of disconnecting the connected link and service (profile).

In addition, upon checking at step S807 that the connection request message has not been received from the corresponding user device, the in-vehicle head unit 10 performs a procedure of disconnecting the connected link and service (profile).

As is apparent from the above description, the method and apparatus according to the present disclosure have the following effects.

First, the present disclosure has an advantage of providing a disconnection method for new device registration and a new device registration method in Bluetooth communication.

Second, the present disclosure has an advantage of providing a new Bluetooth device registration method that is capable of adaptably disconnecting Bluetooth connection based on a progress state of the Bluetooth connection during registration of a new device and registering a new device.

Third, the present disclosure has an advantage of providing a new Bluetooth device registration method that is capable of minimizing a new device registration procedure in an in-vehicle head unit to more rapidly and safely register a new device.

Fourth, the present disclosure has an advantage of providing a new Bluetooth device registration method that is capable of safely interrupting Bluetooth connection according to a user's desire while maintaining compatibility and safety.

Fifth, the present disclosure has an advantage of providing a new Bluetooth device registration method that is capable of displaying an add new softkey for new device registration on a user notification screen at an automatic Bluetooth pairing step to register a new device without user's selection of an additional menu.

It will be appreciated by persons skilled in the art that that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A Bluetooth pairing method for an in-vehicle head unit, the method comprising steps of:
   commencing an automatic Bluetooth connection procedure with a first user device when power is supplied to the in-vehicle head unit;
   checking a progress state of the commenced automatic Bluetooth connection procedure according to a request of a new user device registration;
   performing a disconnection procedure corresponding to the checked progress state; and
   switching to a pairing mode for the new user device registration.

2. The Bluetooth pairing method according to claim 1, wherein the first user device is a user device having Bluetooth paired with the in-vehicle head unit before commencement of the automatic Bluetooth connection procedure.

3. The Bluetooth pairing method according to claim 1, further comprising a step of:

displaying an automatic connection screen including a notification message notifying that the automatic Bluetooth connection procedure is being performed and an add new button for requesting the new user device registration on a screen of the in-vehicle head unit.

4. The Bluetooth pairing method according to claim 3, further comprising a step of:
checking the progress state of the commenced automatic Bluetooth connection procedure when the add new button is selected.

5. The Bluetooth pairing method according to claim 4, further comprising a step of:
cancelling the automatic connection procedure if the add new button is not selected.

6. The Bluetooth pairing method according to claim 1, wherein the progress state comprises a state in which a link is connected and a state in which a profile is connected.

7. The Bluetooth pairing method according to claim 6, further comprising a step of:
completing connection of the link and then disconnecting the link which is connected when the checked progress state is the state in which the link is connected.

8. The Bluetooth pairing method according to claim 6, further comprising a step of:
completing connection of the profile which is connected and then disconnecting the profile which has been connected and the link which has been connected when the checked progress state is the state in which the profile is connected.

9. The Bluetooth pairing method according to claim 6, further comprising steps of:
completing connection of the profile which is connected when the checked progress state is the state in which the profile is connected; and
disconnecting the profile which has been connected and the link which has been connected without attempting to connect the profile in a connection standby state when there is a profile in a connection standby state.

10. The Bluetooth pairing method according to claim 6, further comprising a step of:
rejecting the connection request if a connection request from a second user device in the checked progress state is received.

11. The Bluetooth pairing method according to claim 4, further comprising a step of:
cancelling the automatic connection if the add new button is not selected.

12. The Bluetooth pairing method according to claim 3, further comprising a step of:
displaying, after the step of switching, a vehicle name and a passkey value on a user interface screen of the in-vehicle head unit if a connection request message from the new user device is received.

13. A non-transitory computer-readable recording medium comprising computer executable instructions which cause a controller to perform the method according to claim 1.

* * * * *